(12) United States Patent
Schuster

(10) Patent No.: US 6,669,067 B2
(45) Date of Patent: Dec. 30, 2003

(54) FLEXIBLE BAG CARRIER FOR VEHICLES

(76) Inventor: William E. Schuster, P.O. Box 4125, Utica, NY (US) 13504

( * ) Notice: Subject to any disclaimer, the term of this patent is extended or adjusted under 35 U.S.C. 154(b) by 265 days.

(21) Appl. No.: 09/809,370

(22) Filed: Mar. 15, 2001

(65) Prior Publication Data

US 2002/0145024 A1 Oct. 10, 2002

(51) Int. Cl.⁷ .................................................. B60R 7/00
(52) U.S. Cl. ....................... 224/543; 224/311; 224/403; 211/12; 211/85.15
(58) Field of Search ................................. 224/403, 411, 224/496, 311, 543, 548, 560, 482; 211/12, 85.15

(56) References Cited

U.S. PATENT DOCUMENTS

| | | | |
|---|---|---|---|
| 2,582,650 A | | 1/1952 | Patton |
| 3,920,211 A | * | 11/1975 | Knight ........................ 224/275 |
| 4,682,720 A | * | 7/1987 | Lucas ......................... 224/311 |
| 4,856,744 A | * | 8/1989 | Frankel ....................... 248/215 |
| 4,944,434 A | * | 7/1990 | Hamilton ..................... 224/549 |
| 4,998,694 A | * | 3/1991 | Barteaux ..................... 248/100 |
| 5,014,948 A | * | 5/1991 | Asaro et al. ................. 248/215 |
| 5,137,158 A | | 8/1992 | Brockway |
| 5,246,190 A | * | 9/1993 | Swirkal ....................... 248/100 |
| 5,287,971 A | | 2/1994 | Dorman |
| D353,291 S | * | 12/1994 | Mercer ........................ D6/513 |
| 5,415,457 A | | 5/1995 | Kifer |
| 5,427,288 A | | 6/1995 | Trubee |
| 5,484,091 A | | 1/1996 | Malinowski et al. |
| 5,685,592 A | * | 11/1997 | Heinz ....................... 296/37.16 |
| 5,769,294 A | | 6/1998 | Heinz et al. |
| 5,863,092 A | | 1/1999 | Kifer |
| 5,927,800 A | | 7/1999 | Stallworth |
| 6,041,945 A | * | 3/2000 | Faraj .......................... 211/12 |
| 6,092,704 A | | 7/2000 | Baumeister |
| 6,450,378 B1 | * | 9/2002 | Miller ........................ 224/275 |
| 6,502,731 B1 | * | 1/2003 | Gehring et al. ............. 224/553 |

* cited by examiner

Primary Examiner—Stephen K. Cronin
(74) Attorney, Agent, or Firm—August E. Roehrig, Jr.; Hancock & Estabrook, LLP

(57) ABSTRACT

A readily attachable and removable hanger for suspending flexible bags such as plastic grocery bags filled with groceries and other items, for transport in a vehicle. The bag hanger includes a plurality of shaped hooks and is engageable with a portion of the vehicle for use when transporting filled grocery bags, but which may be quickly removed when not in such use.

9 Claims, 5 Drawing Sheets

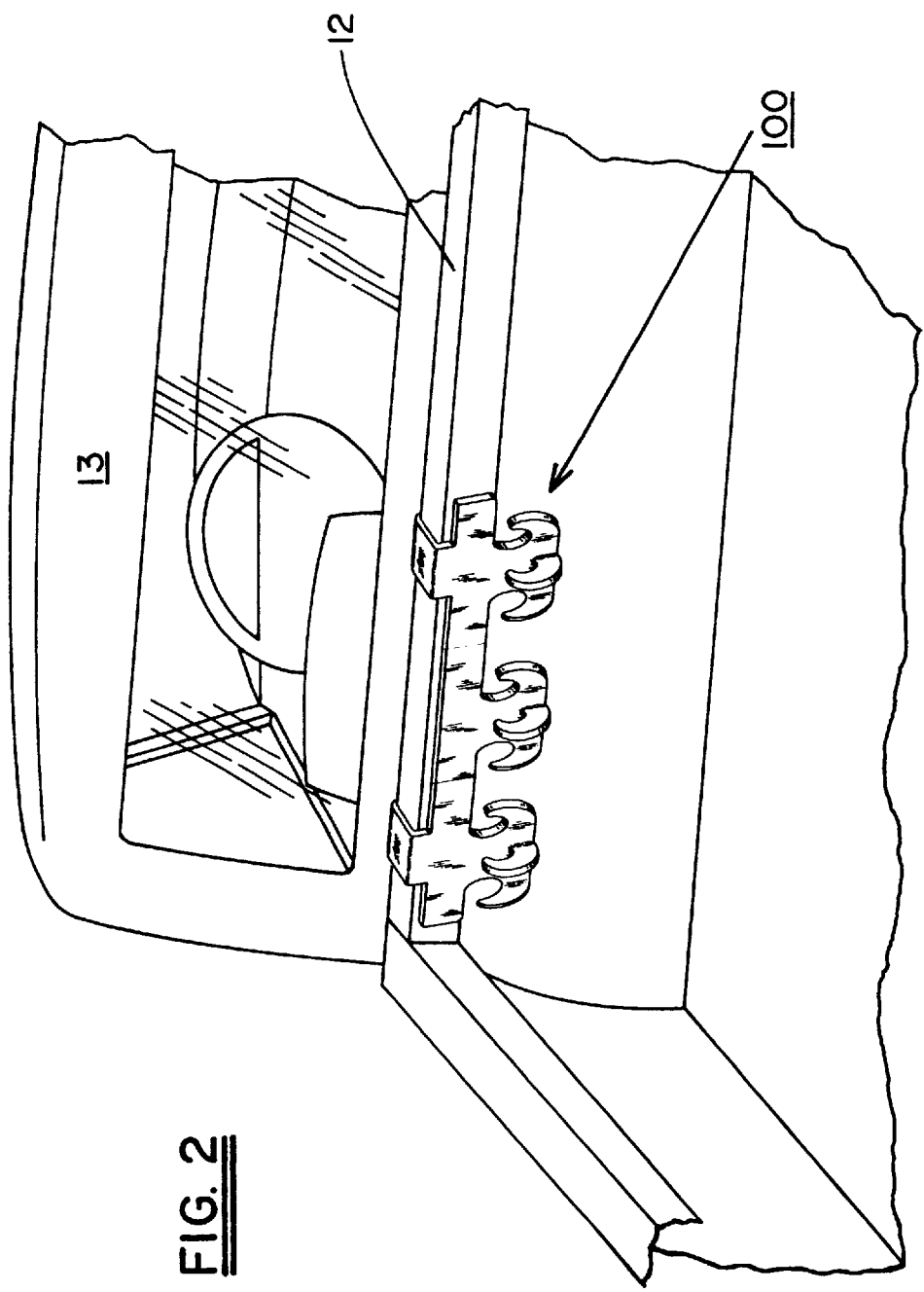

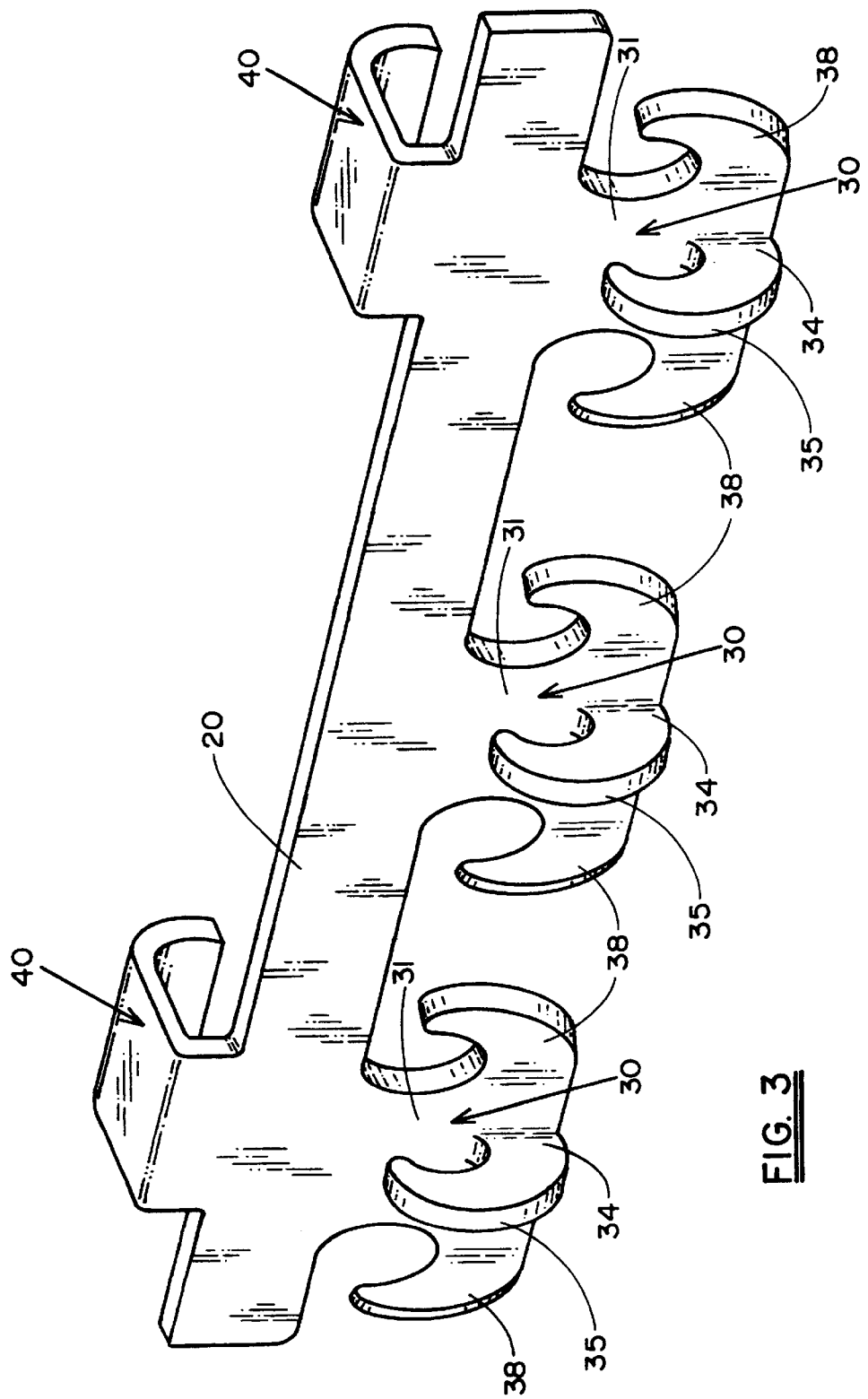

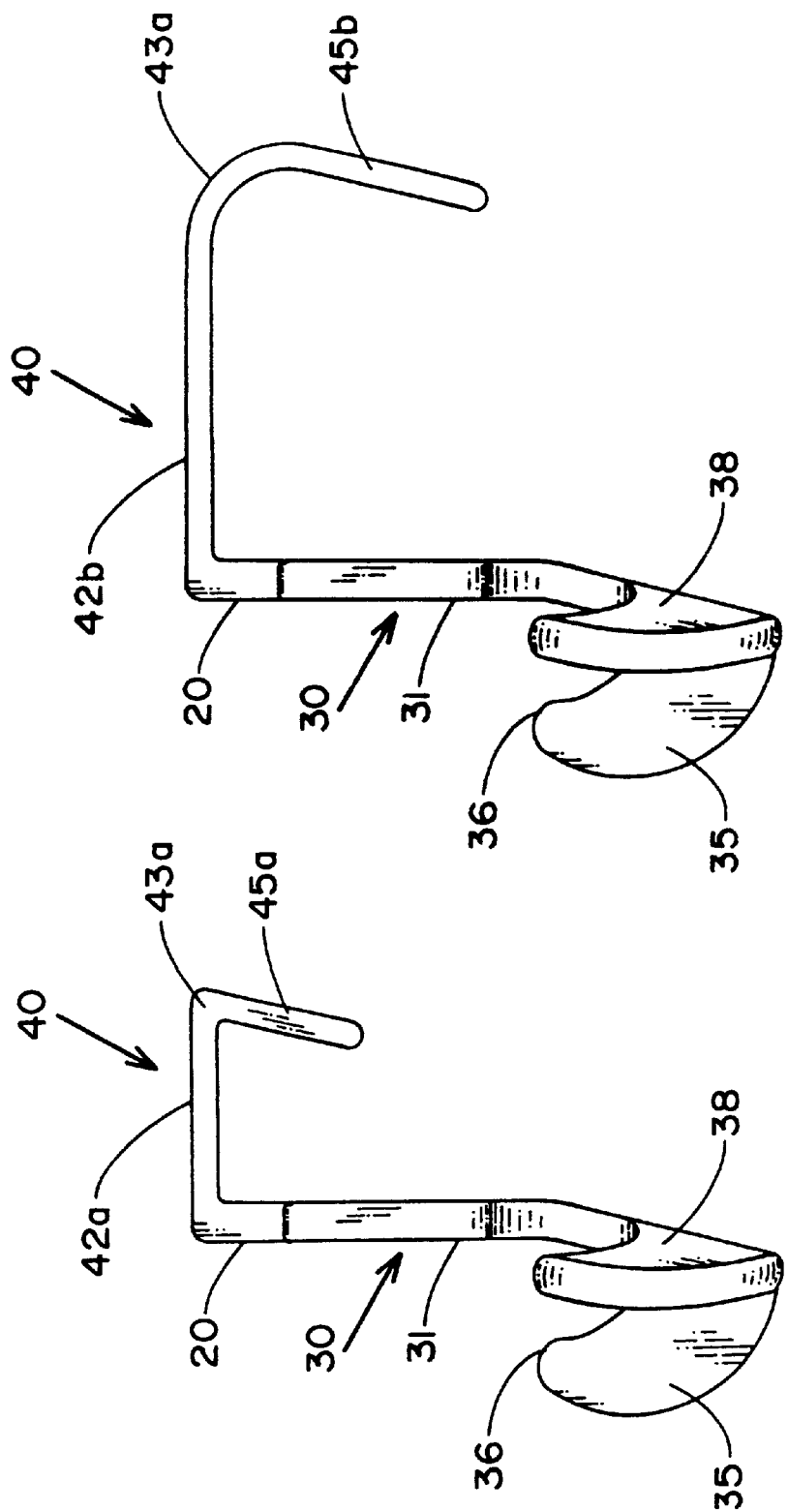

US 6,669,067 B2

FLEXIBLE BAG CARRIER FOR VEHICLES

BACKGROUND OF THE INVENTION

1. Field of the Invention

This invention relates in general to vehicle accessories and, in particular, to an attachable carrier for holding flexible bags.

More specifically, but without restriction to the particular embodiment and/or use which is shown and described herein for purposes of illustration, this invention relates to an attachment for a vehicle which enables flexible bags such as those plastic bags used in retail stores for containing customer purchases to be attached to the carrier for transportation in the vehicle while preventing the bag and contents from moving about inside the vehicle and frequently spilling the contents.

2. Description of Related Art

The use of various devices for attachment to a vehicle or to other structures for securing a flexible bag and its contents are disclosed in the prior art such as, for example, in U.S. Pat. Nos. 2,582,650; 5,137,158; 5,287,971; 5,415,457; 5,427,288; 5,484,091; 5,769,294; 5,863,092; 5,927,800; 6,092,704 and U.S. Des. Pat. No. 322,927. Each of these patents, and the references discussed therein, describe various structure which is secured to a support and utilized to retain articles such as garment hangers, bags and tie downs for various containers.

As is well-known, the strong paper bags made of kraft paper heretofore commonly used for such things as bagging groceries in supermarkets, have been substantially replaced by bags made of plastic-film material having an opened mouth and provided with a pair of upwardly extending handle loops. These plastic grocery bags, commonly referred to as "T-shirt" bags are made of a thin plastic material with cutouts at the open end to form the two handles for carrying the bag. These lightweight recyclable plastic bags are a boon to the retailer for providing an economical method to transport merchandise from the store. However, unlike a paper bag or cardboard box with rigid confines, such plastic bags have no vertical sidewall stability and collapse to the floor when placed in a vehicle. Any groceries or other merchandise in the bag which does not have a flat surface, will have a tendency to roll out of the bag during vehicle acceleration, braking or cornering. Consequently, the consumer must then gather up and repackage the various articles which were contained in the bag when the journey began. Bottles, cans and fruit are especially prone to such redistribution. Should any of the articles spilling out of the bag be fragile or breakable, the purchaser may be faced with cleaning up a wasteful and unsightly mess.

In U.S. Pat. No. 2,582,650 various hook structures are disclosed which are clamped over the back of the rear seat of a vehicle to permit garment bags to lie flat against the seat back.

U.S. Pat. No. 5,137,158 discloses an article support apparatus mounting using magnetic and suction members to provide selective securement to the trunk lid or truck bed wall of a vehicle including suspended hooks for receiving coat hanger members for transporting garments.

U.S. Pat. No. 5,287,971 discloses a rack for supporting loaded grocery bags which is installed in the trunk or cargo compartment of a vehicle and has at least one raised horizontal bar with the ends thereof supported on legs. A series of hooks formed of a resilient spring wire having a u-shaped bend therein define a dilatable clamp, for retaining the bags.

U.S. Pat. No. 5,415,457 discloses an attachment to a vehicle seat back comprising a back wall insert which is secured to the vehicle seat back and an integrally mounted subassembly which includes a row of spaced-apart mounting hooks and mounting flanges extending through the seat back insert with a retaining wire threaded through one of the rows of flanges.

U.S. Pat. No. 5,427,288 discloses a plastic grocery bag holder rack for use in a vehicle that consists of a horizontal telescoping spring-loaded rack which is engageable with vertical support walls of the vehicle and has a plurality of hooks deposed along its length for receiving the handles of conventional plastic grocery bags.

U.S. Pat. No. 5,484,091 discloses a vehicle cargo organizer which includes clips formed in a collapsible frame used as the trunk cargo floor of a vehicle, or as part of a rollout load floor for utility vehicles.

U.S. Pat. No. 5,769,294 discloses a recessed accessory hook for use in an automobile wherein a stowable accessory hook is supported in a surrounding wall structure with the hook tips recessed behind the peripheral rim of the surrounding wall structure, or the structure manually rotatable about a horizontal pivot between stowed and operative positions.

U.S. Pat. No. 5,863,092 discloses a bucket seat including a hanger base which is mounted to a plurality of structural seat members and having a plurality of inverted u-shaped cutouts which define projections for hanging articles such as plastic shopping bags.

U.S. Pat. No. 5,927,800 discloses a theater trash bag which is secured to a bracket attached to the bottom forward portion of the theater chair.

U.S. Pat. No. 6,092,704 discloses a bag and accessory handling system wherein a pivotal rack is supported from the back of a vehicle seat to be elevated into a position for use in hanging bags when legs positioned at the free end of the rack are folded down to engage the vehicle floor for support. In an alternative embodiment the same structure is secured to the underside of the vehicle trunk lid.

U.S. Design Pat. No. 322,927 discloses an ornamental design for a hanger for a bucket or similar article.

None of the devices described in the foregoing patents are directed to a simple, inexpensive, convenient accessory device for use with various types of vehicles which may be conveniently attached to the vehicle when needed, and then removed for storage when not in use.

SUMMARY OF THE INVENTION

It is an object of this invention to improve vehicle accessory attachments for hanging flexible bags, for example, those plastic grocery bags filled with groceries or other items.

Another object of this invention is to provide a simple, inexpensive attachable accessory for attachment to a vehicle to support flexible bags and the contents contained therein which may be readily installed in the vehicle and removed therefrom as needed.

A further object of this invention is to provide a convenient attachable and removable accessory for hanging flexible bags such as plastic grocery bags when filled with groceries or other items during transportation in a vehicle to prevent the contents thereof from spilling during transport.

These and other objects are attained in accordance with the present invention wherein there is provided a readily attachable and removable hanger for supporting flexible bags such as plastic grocery bags filled with groceries and other items, for transport in a vehicle. The bag hanger includes a plurality of shaped hooks and is engageable with a portion of the vehicle for use when transporting filled grocery bags, but may be quickly removed when not in such use.

DESCRIPTION OF THE DRAWINGS

Further objects of this invention, together with additional features contributing thereto and advantages accruing therefrom, will be apparent from the following description of preferred embodiments of the present invention which are shown in the accompanying drawings with like reference numerals indicating corresponding parts throughout and which are to be considered in conjunction with the following drawings, wherein:

FIG. 2 is a rear perspective view of a portion of the bed of a pick-up truck in which an alternative embodiment of the invention is installed;

FIG. 3 is a frontal perspective view of the embodiment of the removable bag carrier illustrated in FIG. 1;

FIG. 6 is an end elevational view of the embodiment of the invention as illustrated in FIG. 1 to better illustrate the vehicle engaging hanger which removably connects the hanger to a vehicle; and FIG. 7 is an end elevational view of an alternative embodiment of the invention as illustrated in FIG. 2, which is the same as the embodiment illustrated in FIGS. 1, 3 and 6 except for the portion of the hanger which engages a vehicle for removable attachment thereto.

These and additional embodiments of the invention may now be better understood by referring to the following detailed description of the invention wherein the illustrated embodiments are described.

DETAILED DESCRIPTION OF THE INVENTION

Throughout this description, the preferred embodiments and examples shown should be considered as exemplars, rather than limitations on the apparatus of the present invention.

Figure 1:
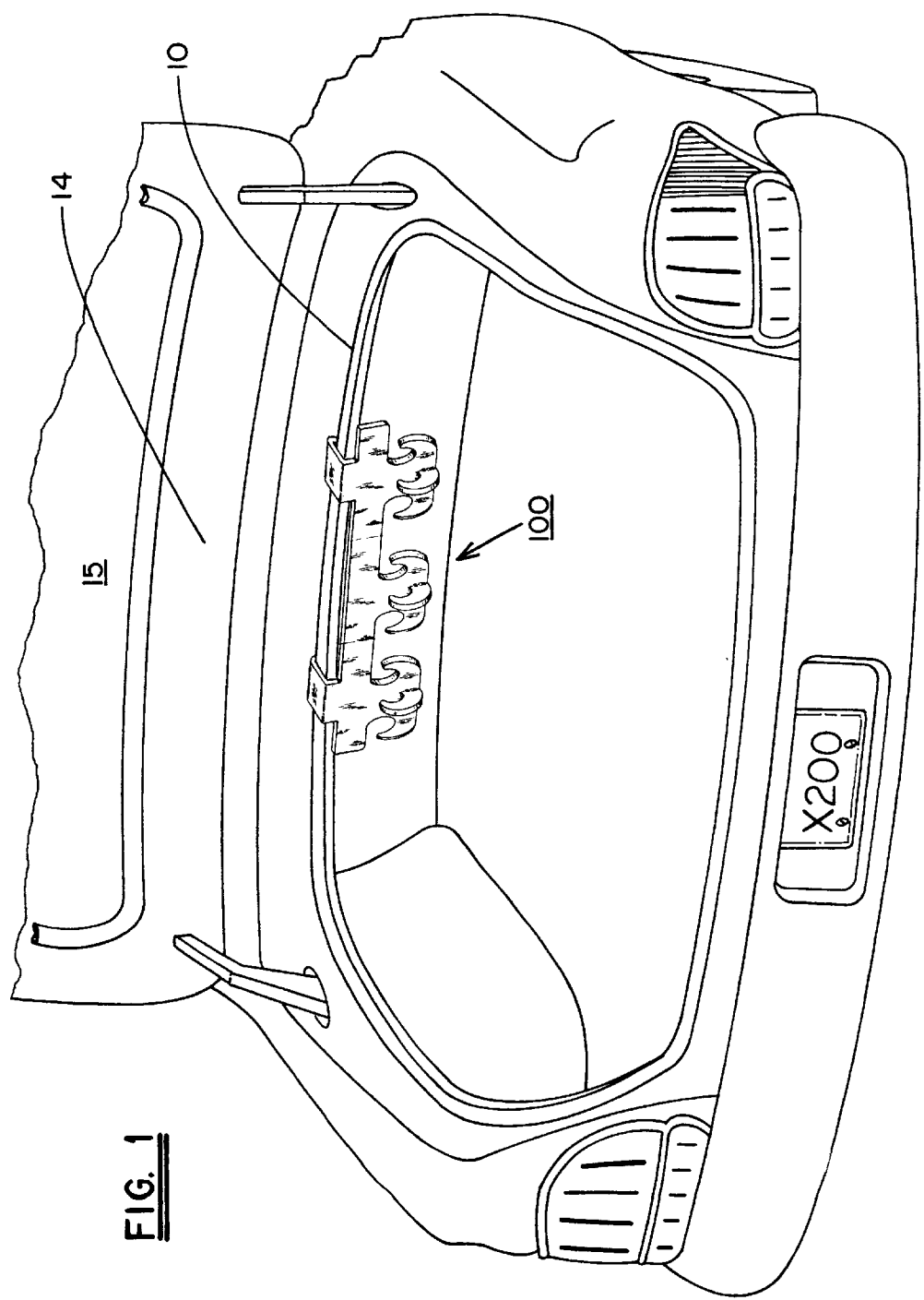
FIG. 1 is a rear perspective view of an open trunk portion of an automobile to better illustrate an embodiment of the invention as installed.

Referring now to the drawings, there is shown in FIG. 1 a first embodiment of the flexible bag hanger 100 which is removably securable to vehicle trunk gutter 10 positions beneath the forward portion 14 of the vehicle trunk deck 15, and inside the trunk such that the hanger 100 and flexible bags supported therefrom will be protected from the elements during transportation when the trunk deck or lid 15 is closed.

The flexible bag hanger 100, in both the embodiments illustrated in FIG. 1 and FIG. 2 is the same except for the length of a bridge portion 42a, best illustrated in FIG. 6, and 42b, best illustrated in FIG. 7, and the snap-fit leg portion 45a and 45b which extends downwardly from the distal end of the bridge portions 42a and 42b, respectively.

As best illustrated in FIGS. 3–7, the flexible bag hanger 100 includes a plurality of bag supports 30 illustrated as three in FIG. 3. However, the number of bag supports 30 can be varied depending upon the width of the flexible bag hanger 100 desired.

Figures 4, 5:
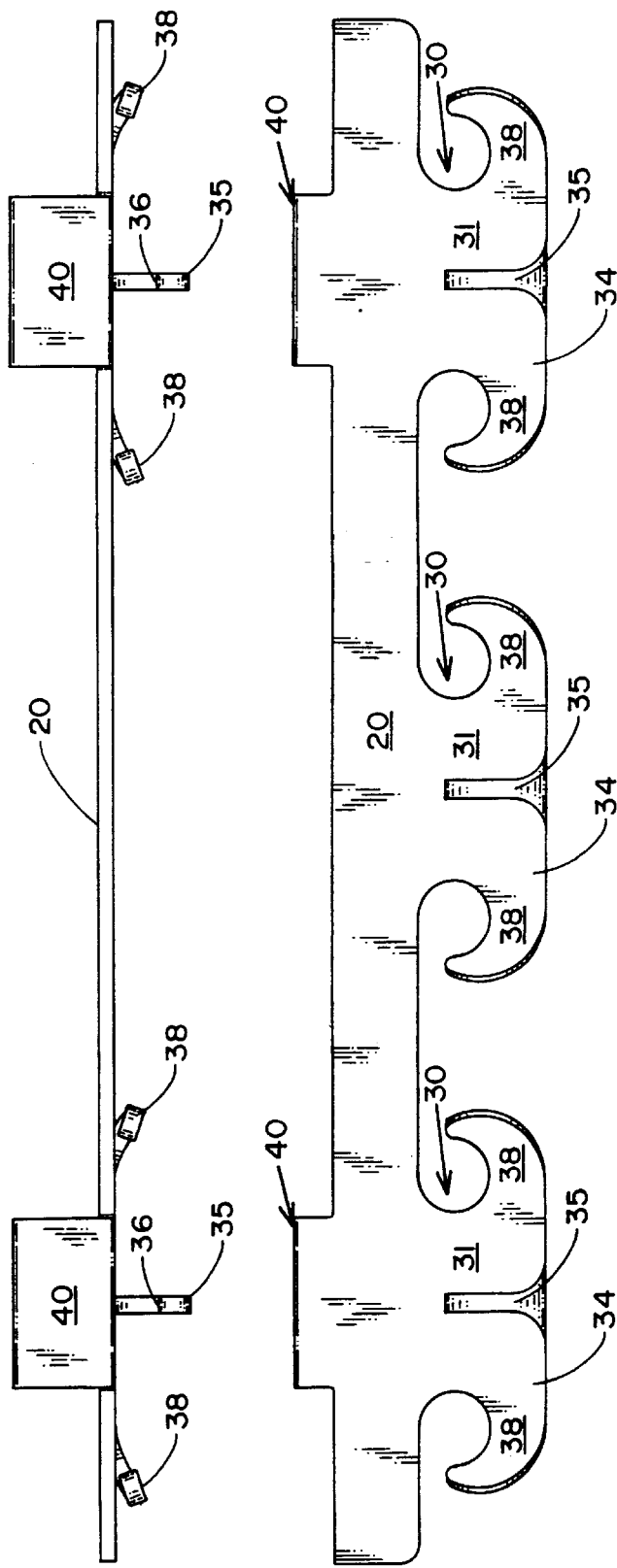
FIG. 4 is a front elevational view of the invention to better illustrate the components thereof.
FIG. 5 is a top planar view of the embodiment of the invention as illustrated in FIG. 1 to better illustrate the manner in which the bag engaging hooks are formed.

Each of the bag supports 30 include three projecting hooks, a center hook 35 and side hooks 38, one positioned on either side of the central hook 35. As best illustrated in FIGS. 3, 5 and 7, the center hook 35 extends outwardly from a lower portion 34 of the bag support 30 in a plane substantially perpendicular to a front face 31 of the bag support 30. The center hook 35 has a distal end 36 which curves outwardly from the face 31 of the bag support 30 in a smooth curve which terminates with the distal end 36 of the center hook 35 pointing upwardly and towards the face 31 of the bag support 30, but spaced therefrom. In this manner the center hook 35 is positioned to engage the handle of a flexible bag to retain the bag in a secured position, but a bag so positioned may be easily removed from, or placed thereon.

The side hooks 38 extend outwardly from the lower portion 34 of the bag support face 31 and curve upwardly towards a longitudinally extending bag support bar 20 from which the bag supports 30 depend. The terminal portion of the distal end 36 of the side hooks 35 curve back toward the face 31 of the bag support 30 to facilitate engagement with the handles of the bags to be carried thereby. To facilitate placing the bags onto and removing bags from the flexible bag hanger 100, the side hooks 38 are each formed to extend outwardly from the plane of the bag support face 31 towards the center hook 35 as best illustrated in FIGS. 5–7. In this manner neither the bag supports 30 nor the longitudinally extending bag support bar 20 will interfere with placing bags onto or removing them from the flexible bag support 100. In addition, such positioning of the hooks 35 and 38 permits multiple bags to be carried by each bag support 30.

Referring now to the alternative embodiment of the flexible bag hanger 100 illustrated best in FIGS. 2 and 7, this embodiment is the same as the embodiment previously described except that the vehicle hangers 40 through which the flexible bag hanger 100 is removably secured to a vehicle, are formed with the bridge portions 42a and 42b of different lengths, and the snap-fit leg portions 45a and 45b are of different lengths and configurations.

Referring first to the embodiment illustrated in FIG. 6, the bridge portion 42a is shown extending a first width of approximately 1" which has been found sufficient to allow the flexible bag holder 100 to engage the gutter 10 of a vehicle trunk, with the bridge portion 42a extending over the trunk gutter 10, and seal if present, to retain the flexible hanger 100 in the proper position. The snap-fit leg portion 45a, which extends downwardly from the distal end 43a of the bridge portion 42a approximately ⅞", is tapered inwardly towards the bag support 30, preferably at an angle of approximately 13° from the vertical. In this manner the snap-fit leg 45a retains the flexible bag hanger 100 in the appropriate position on the trunk gutter.

Referring to the embodiment illustrated in FIG. 7, the bag support 30 and hooks 35 and 38 are the same as that previously described, but the length of the bridge portion 42b extends twice as long as that illustrated in FIG. 6. This extended width permits the bridge portion 42b to pass over the front of the truck box or bed wall 12, right behind the truck cab 13, for example, and the snap-fit leg 45b has a curved radius extending from the distal end 43b of the bridge portion 42b downwardly approximately 1½" to retain the flexible bag hanger 100 against the inner wall of the truck box or bed. The distal portion of the snap-fit leg 45b is curved inwardly towards the bag support 30 approximately 10° from the vertical.

While this invention has been described in the specification and illustrated in the drawings with reference to preferred embodiments, the structures of which have been disclosed herein, it will be understood by those skilled in the art to which this invention pertains that various changes may be made, and equivalents may be substituted for elements of the invention without departing from the scope of the claims. Therefore, it is intended that the invention not be limited to the particular embodiments disclosed in the specification and shown in the drawings as the best mode presently known by the inventor for carrying out this invention, nor confined to the details set forth, but that the invention will include all embodiments, modifications and changes as may come within the scope of the following claims:

What is claimed is:

1. A vehicle accessory installable on a vehicle for hanging articles such as flexible plastic bags therefrom, comprising:

an elongated support bar for supporting at least one article suspended therefrom;

said support bar including at least one support member depending therefrom and lying in a plane coincident with said support bar;

said support member including at least one integrally formed center hook extending outwardly therefrom in a plane substantially normal to the plane of said support member for receiving thereon an article to be suspended therefrom;

said support member further including at least two integrally formed side hooks with at least one of said at least two side hooks being positioned on each side of said center hook; and each one of said side hooks extending outwardly from said support member in a plane lying between the plane in which said support member is positioned and the plane in which said center hook lies.

2. The vehicle accessory of claim 1 further including;

a vehicle attaching bridge extending outwardly from said elongated support bar in a direction opposite to said center hook; and a portion of said vehicle attaching bridge extending outwardly in a plane normal to the plane of said support member and having a distal snap-fit leg portion extending downwardly in a plane intersecting the plane of said support member for forming a removable coupling to removably connect said vehicle accessory to a vehicle.

3. The vehicle accessory of claim 1 further including a vehicle attaching bridge extending outwardly from said elongated support bar in a direction opposite to said center hook;

a horizontally extending portion of said vehicle attaching bridge extending outwardly from said elongated support bar in a direction opposite to said center hook;

said horizontally extending portion lying in a plane normal to the face of said support member and having a snap-fit leg portion depending from the distal end thereof; and said snap-fit leg portion lying in a plane which intersects the plane of said support member face for forming a removably coupling to removable connect said vehicle accessory to a vehicle.

4. The vehicle accessory of claim 3 wherein said vehicle attaching bridge extends vertically upwardly above said elongated support bar.

5. The vehicle accessory of claim 4 wherein said elongated support bar includes at least two vehicle attaching bridges.

6. The vehicle accessory of claim 5 wherein said elongated support bar includes at least two support members.

7. The vehicle accessory of claim 6 wherein each one of said support members includes three hooks.

8. The vehicle accessory of claim 7 wherein said elongated support bar includes three support members.

9. The vehicle accessory of claim 8 wherein said support members includes three hooks.

* * * * *